Sept. 13, 1960 H. P. KALMUS ET AL 2,952,813
DEVICE FOR THE AMPLIFICATION OF MINUTE SPACE CURRENTS
Original Filed April 22, 1948 4 Sheets-Sheet 1
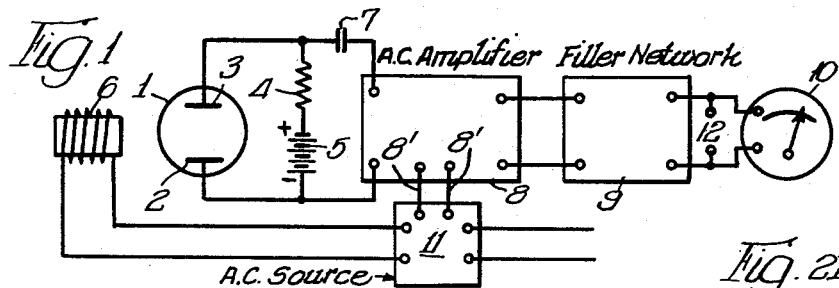
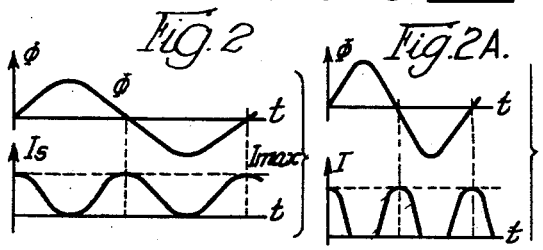
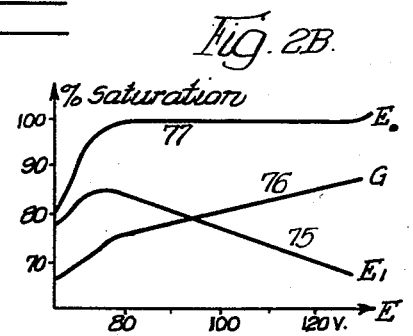
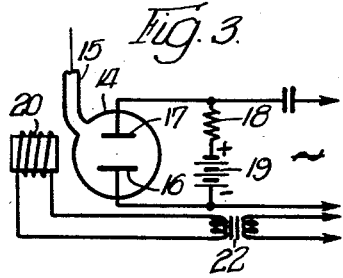
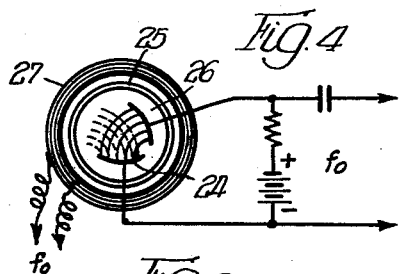
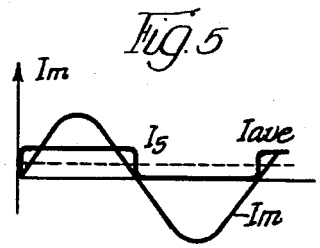
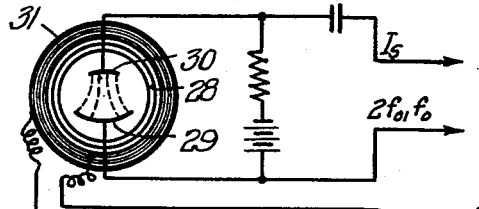
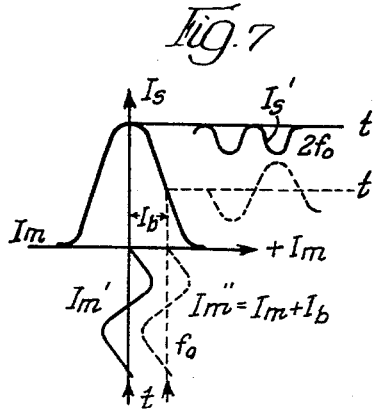
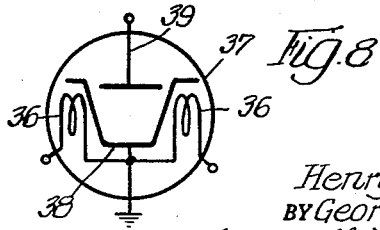
INVENTORS
Henry P. Kalmus,
BY George O. Striker,
Cromwell, Greist + Warden Sept. 13, 1960     H. P. KALMUS ET AL     2,952,813
DEVICE FOR THE AMPLIFICATION OF MINUTE SPACE CURRENTS
Original Filed April 22, 1948     4 Sheets-Sheet 2
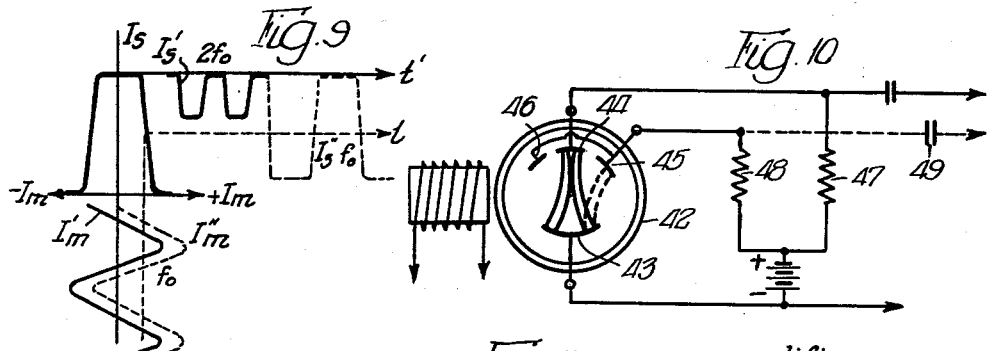
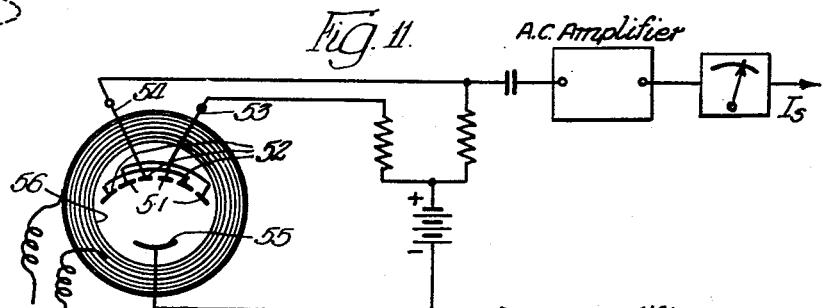
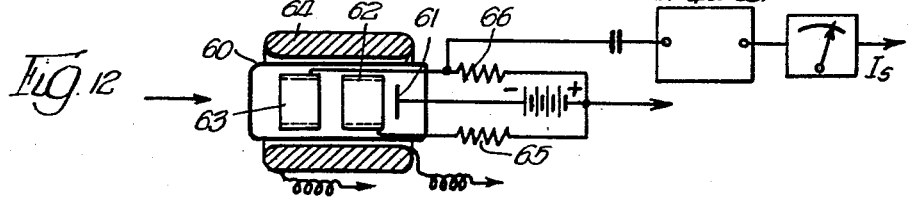
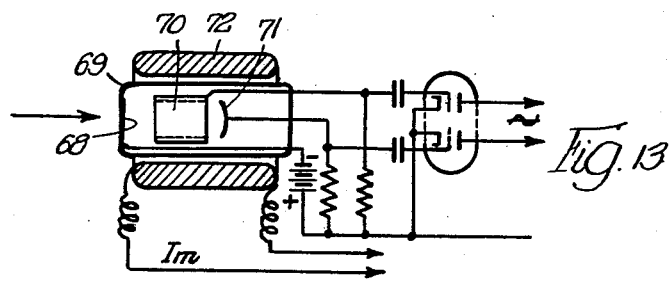
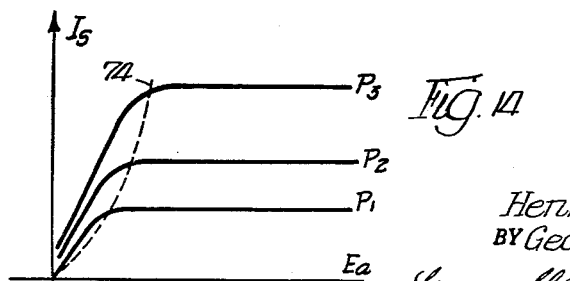
INVENTORS.
Henry P. Kalmus,
BY George O. Striker,
Cromwell, Greist & Warden
ATTYS.

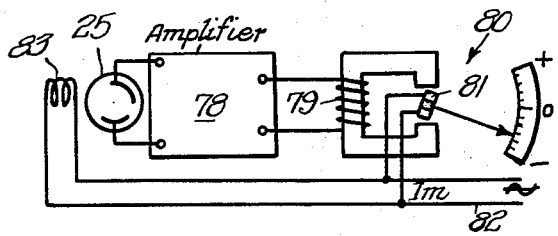
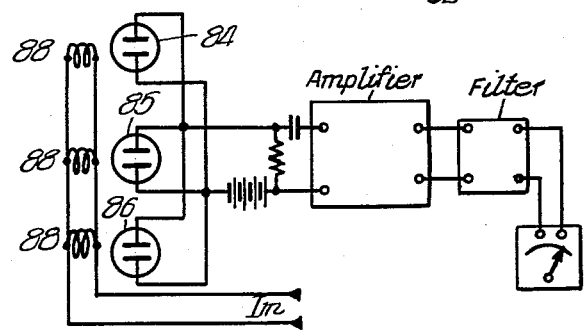
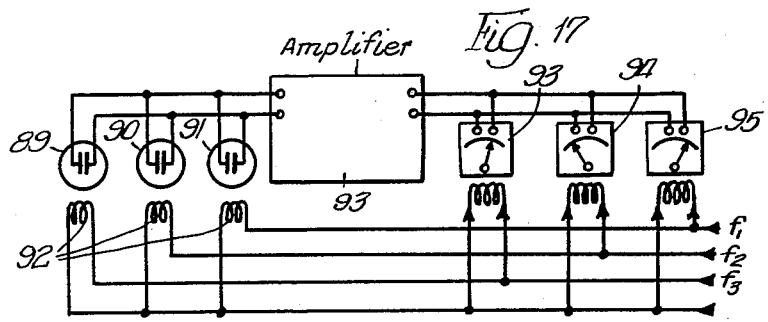
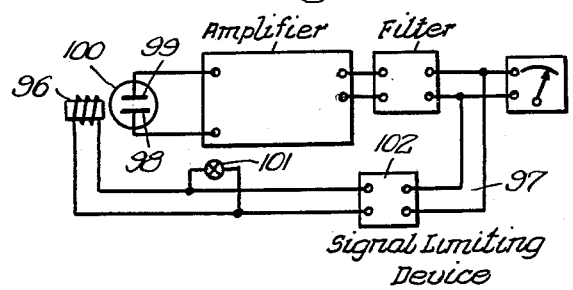

Sept. 13, 1960   H. P. KALMUS ET AL   2,952,813
DEVICE FOR THE AMPLIFICATION OF MINUTE SPACE CURRENTS
Original Filed April 22, 1948   4 Sheets-Sheet 4
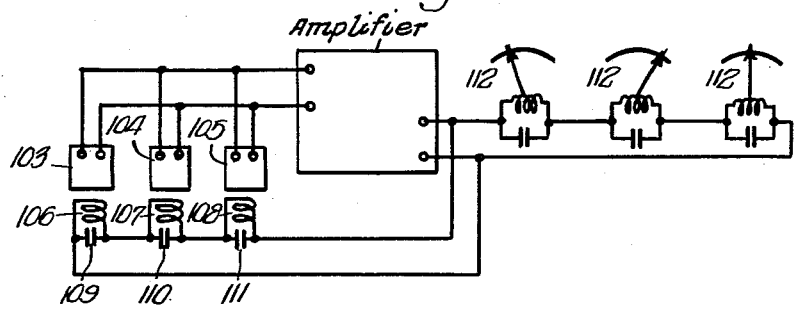
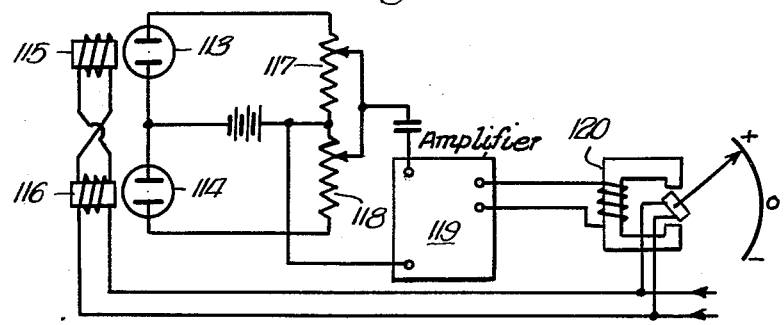
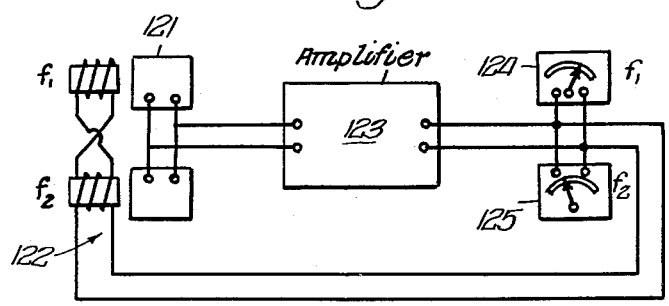
INVENTORS.
Henry P. Kalmus,
BY George O. Striker,
Cromwell, Greist & Warden
Attys United States Patent Office 2,952,813
Patented Sept. 13, 1960

2,952,813

DEVICE FOR THE AMPLIFICATION OF MINUTE SPACE CURRENTS

Henry P. Kalmus, 3000 University Terrace NW., Washington, D.C., and George Otto Striker, Katona J. utca 23/a, Budapest XIII, Hungary Continuation of application Ser. No. 273,526, Feb. 14, 1952, which is a division of application Ser. No. 22,648, Apr. 22, 1948. This application Aug. 20, 1958, Ser. No. 756,145

3 Claims. (Cl. 328—253)

The amplification of the effects of small electronic or ionic space currents which hold their value for intervals longer than about one second presents the designer with serious problems of drift, stability, linearity and complexity of design. Such effects, as a rule, have been amplified for the purpose of measurement, control, etc., by the use of direct current amplifiers of the "direct-coupled" type, having well known disadvantages of design. In order to eliminate the use of D.C. amplifiers, several methods have been used. Some of these employ mechanical means to convert the minute D.C. signals into an alternating current for more efficient amplification. Others have introduced an A.C. "sub-carrier" by impressing an A.C. voltage on an amplifier electrode, thereby periodically varying the gain of the system. The former method is disliked for its reliance on mechanically moving interrupting means, while the latter one presents serious problems of accomplishing exact balance, so that no disturbance shall be introduced by the "sub-carrier" voltage in the absence of a D.C. space-current.

Our invention presents a simple device or system for the amplification of minute voltage generated by electronic or ionic space currents which lacks the above drawbacks and is capable of stable, simple and reproducible amplification of such voltages in a way not heretofore possible.

In attaining this objective, the invention presents an improved method or procedure for the amplification of minute space currents which involves the electromagnetic modulation of the space current by subjecting the same to an alternating magnetic field, whereupon the modulated signal derived from the thus treated space current is forwarded through a frequency selective, A.C. amplifier system and preferably also through a filtering or rectification unit, and the modulating electromagnetic field is controlled in a way to obtain maximum modulation efficiency for a minimum line voltage which is to be expected as an excitation source for the field. Thus, in connection with any increase in amplifier gain in response to a change in line voltage a constant amplified output is nevertheless assured.

It is one of the primary objectives of the invention to provide a method and apparatus or system for amplifying minute space currents which operate on the foregoing principle. Various refinements in related types of apparatus or system are also disclosed, which avoid the drawbacks of D.C. amplification and of mechanical modulation and also present other distinct advantages in practical respects. It is not deemed to be in order here to discuss these variants individually at this point because of the number thereof.

The foregoing statements are indicative in a general way of the nature of the invention. Other and more specific objects will be apparent to those skilled in the art upon a full understanding of the composition and operation of the improved system in its various embodiments.

In the drawings:

Fig. 1 is schematic layout of a device or system for the modulation of space currents and the amplification and application of voltages derived therefrom, in accordance with the general principle of the invention;

Fig. 2 shows two graphs, one plotting electromagnetic flux against time and the other plotting space current against time, to demonstrate the effect of a varying magnetic field in modulating a space current of small value;

Fig. 2A similarly shows two graphs pointing out the effect of a large field on the space current in an overdriven condition;

Fig. 2B is a plot of the fundamental content of the input signal to an amplifier and the gain of the amplifier verusus line voltage and the resultant amplified output voltage;

Fig. 3 is a schematic layout illustrating a modification of the principle of the invention intended for use in the measurement of gas pressure, which employs an ionizing gas discharge vessel or tube;

Fig. 4 schematically depicts a further modification or adaptation of the invention in which a variation or modulation of the effect of a minute space current is had in synchronism with a fundamental frequency of an alternating excitation current by one arrangement of the electrode of the space current vessel;

Fig. 5 is a graph plotting magnetic flux and space current against time to illustrate the identity of frequency of space current and modulating field which results from the arrangement of the electrodes of Fig. 4;

Fig. 6 is a schematic diagram generally similar to Fig. 4, illustrating how a modulated space current can be produced at a frequency which is a harmonic of the excitation frequency by a different arrangement of electrodes;

Fig. 7 is a graph showing the effect of the arrangement of Fig. 6 in determining the frequency of the space current, as compared with the excitation frequency;

Fig. 8 schematically represents a variation in the principle of the invention, in which electromagnetic modulating coils are enclosed in the same vessel as the electrodes across which a space current is generated;

Fig. 9 is a graph showing the dependance of frequency and wave shape of the space current on the wave shape and biasing of the modulating current;

Figs. 10 and 11 illustrate different modifications of the principle of the invention to provide output voltages at multiples of the frequency of the modulating current;

Figs. 12 and 13 are schematic diagrams of modified systems employing magnetic focusing, rather than electromagnetic deflection, in the generation of a modulated space current output;

Fig. 14 is a graph depicting a family of space-current versus anode-voltage curves dependant on different light intensities, in a typical installation in a vacuum phototube;

Fig. 15 represents a modification of the principle of the invention wherein the filter network of Fig. 1 is replaced by a synchronized rectifier;

Fig. 16 schematically shows a further system for the utilization of space current effects generated in more than one discharge vessel;

Fig. 17 schematically represents another adaptation of the system to provide separate indications derived from multiple signal input devices;

Fig. 18 schematically shows a modification employing feed-back whereby part of the output is used to energize the magnetic field;

Fig. 19 schematically shows still another feed-back modification in which several input devices are magnetically excited at different frequencies;

Fig. 20 schematically shows an arrangement involving magnetic modulation in opposite phase relation in two different tubes or vessels to compare the ratio between their space currents; and Fig. 21 schematically shows a similar ratio device in which the total energy for energizing two magnetic fields is taken from the amplifier output.

In order to describe the principles of our invention, we first refer to Fig. 1. Here a vessel 1 is shown which may be partially or entirely evacuated. Electrodes such as a cathode 2 and an anode 3 are connected into a circuit with a resistance 4 and a D.C. voltage source 5. A current may flow in this circuit due to the following reasons: electron-emission from the cathode, ionization of any gas present, and conductive leakage between the electrodes. While we often desire to amplify the two space-currents derived from the first named phenomena, we are eager to exclude the third influence of leakage.

In order to attain this result and to render the minute electronic or ionic space currents easily capable of amplification, we apply a periodically variable magnetic field to the space between the electrodes. This field is so oriented that it will have at least a component at right angles to the normal flow of electrons or ions in the space. Thus an alternating magnetic field, generated by an electromagnet 6 in the vicinity of electrodes 2 and 3, will periodically alter the magnitude of space-current between these electrodes and thus produce an alternating potential across resistor 4 capable of stable amplification. This small A.C. voltage is applied through a condenser 7 to the input of a conventional alternating current amplifier 8. The amplified A.C. voltage is passed through a filter network 9 which attenuates all frequencies other than that generated in the input circuit. In this manner we reduce the response of the system to any undesired voltages or currents, such as circuit noise, tube noise, microphonism or external disturbances. It is of course also possible to incorporate the filter network into the amplifier 8 proper or into a suitable meter or like indicating means 10 connected to the output of the amplifier, by which means the value of the amplified current may be read. Any suitable control device may be substituted for unit 10. The reference numeral 11 indicates a source of A.C. current for the energizing of electromagnet 6, such as a line transformer or an A.C. generator. The leads 8′ are the line supply for the amplifier 8. Terminals 12 at the output of filter 9 may be used for deriving an amplified voltage for remote indication or control, in addition to the operation of instrument 10. Rectifiers of known kind may be used to obtain D.C. currents from the output.

In Fig. 2 is plotted the way of varying the space current $I_s$ in discharge vessel 1. In the upper, flux-time curve the sinusoidal variation of the magnetic flux generated by the electromagnet 6 is plotted versus time. The lower current-time curve indicates the corresponding variation in space-current $I_s$, using the same time-scale. The current reaches a maximum $I_{max}$ whenever the flux has zero value. $I_{max}$ is that space current which flows in the absence of any magnetic field. As magnetic flux reaches its positive or negative maximum, however, the space current $I_s$ is suppressed to a minimum value due to deflection of the electrons or ions from their paths to the anode 3. These deflected particles are then either returned to the cathode or they strike the walls of the vessel 1. They do not contribute to the total space current. Other arrangements, resulting in a different relation between current and magnetic flux will be described below. The principle described above, consisting in the periodic variation or regular modulation of the otherwise constant or slowly changing space current by the use of a magnetic field, with subsequent amplification of the resulting alternating voltage by means of a sharply tuned A.C. amplifier, may be applied to the amplification of space currents of varied origin.

In Fig. 2, conditions are shown for such an amplitude of the magnetic field that full modulation of the space current is obtained. This means that the space current contains a maximum amount of energy at its fundamental frequency. If the alternating magnetic field is increased, conditions as shown in Fig. 2A prevail. Now, the space current is suppressed completely during a large part of the modulation cycle so that only pulses at twice the modulating frequency are obtained. The fundamental content of this wave form is smaller than the one shown in Fig. 2.

This effect is utilized to obtain constant output of the device in spite of heavy line voltage fluctuations. In our design, the magnetic field is excited in such a way, that maximum modulation is obtained for the minimum line voltage to be expected. If the line voltage increases the fundamental content decreases. In Fig. 2B this is expressed by curve 75 for $E_1$.

The gain G of the amplifier, however, increases with increasing line voltage as shown in curve 76 of Fig. 2B. As a result, the output $E_0$ can be kept constant over wide ranges as shown by curve 77. Thus the invention eliminates the need for special means to stabilize supply voltage.

Fig. 3 shows an arrangement utilizing magnetic modulation for the measurement of gas pressure, resulting from the ionization of gases present in the discharge vessel. Such ionization may be caused by the use of an intense electrical field across electrodes of the vessel, as well as by irradiation of the gas by electromagnetic radiation of short-wave length, i.e., by ultra-violet, X-ray or gamma rays or by nuclear particles. A suitable arrangement of the magnetic field with respect to the electrodes makes it possible to increase or decrease the ionic current, and in either case the periodically varying magnetic field will impart an alternating current characteristic to the ionization-current. This may then be amplified by a tuned A.C. amplifier of high gain.

Referring to Fig. 3, a gas-discharge vessel or tube 14 is in this case provided with a connecting passage 15 leading to a vacuum or pressure system (not shown) in which gas pressure is to be measured, observed or controlled. A space-current, partly due to ionization of the gas, will flow between cathode 16 and anode 17 of vessel 14 through resistor 18 and D.C. supply 19. Electromagnet 20 causes a periodically varying field to exist in the space between the cathode and anode, periodically varying the current through the system. The resulting A.C. potential is connected through coupling condenser 21 to a tuned amplifier, as in Fig. 1. The electromagnet 20 is energized through transformer 22 from a suitable A.C. supply. In order to improve the total signal output in the pressure range to be controlled, observed or measured it may be advantageous to pre-magnetize magnet 20 with the use of a bias-current supply or by a permanent magnet.

Space current may be caused by thermionic emission from the cathode surface, which may be heated by conduction, radiation or otherwise. In this case the output of the amplifier will be a function of the minute temperature changes of the cathode surface, or a function of its thermal emissivity.

We may advantageously utilize a system operating on the principle of the invention for the amplification of minute space currents caused by electromagnetic radiation impinging upon a cathode which is specially treated to release electrons in the range of desired radiation. This range may lie in any of the infrared, the visible, the ultraviolet and the X-ray portions of the spectrum. In all these cases the output of a tuned amplifier into which the magnetically modulated voltage is fed may be made a function either of the magnitude and spectral distribution of the radiation, the emissive condition of the cathode, or the additional ionization due to gases present in the discharge vessel, or gas-multiplication. It should be mentioned that corpuscular radiation, i.e., that of fast moving elementary particles of the nucleus, may also be utilized to cause electron-emission from a suitable cathode surface, with attendant alternating electromagnetic variation in accordance with the invention.

It is often desired to amplify a space current caused by secondary emission of a conductive surface. This, for example, is a phenomenon attending the operation of so-called photo-multiplier tubes. In such structures it may be impractical to apply a variable magnetic field to a cathode directly excited by light, it being preferable to periodically vary the current in one or more of the subsequent stages of the device. Since these stages operate by space currents arising from secondary emission, they may be modulated by a magnetic field in accordance with our invention.

Similarly, in instances where small electron space currents of high velocity are to be measured, there may be a great advantage in modulating the more substantial electronic space currents caused by secondary electron emission of relatively low velocity. Such electrons will then require a much lower electromagnetic field to obtain a substantial alternating current component suitable for amplification.

The principle of the present system will also conveniently modulate such electronic space currents as are generated at a cathode in consequence of high-energy gas ions striking the surface and liberating electrons by ion-bombardment. The output of the tuned amplifier will then be a function of the number and energy of such ions, being naturally also dependent on the characteristics of the cathode surface.

Figs. 4–7, inclusive, illustrate the adaptability of an amplifier and filter, used according to our invention, to be tuned either to the same frequency as that of the modulating magnetic field or to a harmonic thereof, depending on the operating characteristic of the modulating structure and output indicator or control 10. Whereas the fundamental frequency is particularly suited for use with certain synchronous indicating or controlling means which respond only to this fundamental frequency, the use of a harmonic of the periodic exciting current at the electromagnet presents other advantages. These stem from the fact that any stray voltages induced electrostatically or inductively into the input circuit by the exciting current will be suppressed in an amplifier or indicator tuned, for example, to twice the exciting frequency, and having little response at the undesired frequency. It is advantageous to use even higher harmonics of the exciting current when extreme amplification with very low disturbance level is required.

Structural modifications of the discharge vessel are employed in order to secure good efficiency either at the fundamental or a harmonic of the exciter frequency. Fig. 4 shows a basic arrangement yielding a high percentage of A.C. current at the fundamental frequency, $f_0$. Electrons leaving cathode 24 of vessel 25 will strike its anode 26, which is arranged in angularly offset relation to the cathode, only while the magnetic field generated by a field-coil 27 surrounding the vessel deflects the electrons toward the anode, as indicated in solid lines in Fig. 4. During the remaining time, in which the magnetic field has an opposite polarity, the electrons will be deflected away from anode 26, as indicated in dotted lines, with a resulting decrease in space current.

From the flux-time diagram of Fig. 5, corresponding to the arrangement of Fig. 4, it is clear that the instantaneous space current $I_s$ will vary in relation to its average value $I_{ave}$ essentially at the fundamental frequency of the original magnetic field current $I_m$. The shape of the alternating space current component should approach a square wave form since such a wave form contains a maximum of energy at the desired fundamental frequency.

Fig. 6, on the other hand, shows a structure enabling the generation of an alternating field either at the fundamental or at a harmonic frequency. Vessel 28 contains a cathode 29 and an anode 30 of smaller area than the cathode, being disposed directly opposite the latter. Electromagnet 31 surrounding the vessel generates a varying magnetic field between these electrodes which has at least a component at right angles to the path of the electrons in each rise and fall of the flux curve. The electromagnet 31 is energized through transformer 32 by a suitable A.C. source. A D.C. source 33 may also be switched into the circuit by switch 34.

Fig. 7 shows the relation of the original alternating current $I_m$ in coil 31 to the resulting periodic variations in space current $I_s$. Curve 35 represents the value of $I_s$ as a function of positive and negative values of $I_m$. $I'_m$ and $I''_m$ symbolize two variations in the magnetizing current, i.e., lacking and supplied with a direct current component, respectively, as determined by switch 34. The correlated space current curves, labeled $I'_s$ and $I''_s$ are derived in a known manner from curve 35. As shown in Fig. 7, in the absence of a D.C. component in the original alternating excitation current $I_m$ we obtain essentially twice the fundamental frequency, $f_0$, in space current $I'_s$. With switch 34 in position to cut in a D.C. component, a bias-current $I_b$ shifts the operating point in such a way that the original frequency $f_0$ is reproduced in $I''_s$.

According to another embodiment of our invention, illustrated in Fig. 8, we enclose an electromagnet coil 36 in a tube or vessel 37. This assures the greatest proximity of the modulating field to the electrodes, thereby further increasing the efficiency of operation and compactness of design. A grounded electrode or cathode 38 is preferably extended so as to shield coil 36 from influencing the potential of the other electrode 39 by capacitive influence.

In all embodiments of our invention we prefer to use electromagnets of very low electrical impedance—preferably below 2 ohms—to provide sufficient magnetic field in the space between electrodes at a very low driving voltage, say 2 volts or less. In this manner electrostatic disturbance from the coils is reduced to a minimum with only moderate shielding of the high impedance portions of the input circuit.

As indicated above, devices in accordance with our invention can be operated with improved efficiency by providing means to modulate the space current in a square-wave fashion. A Fourrier-Analysis of various non-sinusoidal waves teaches that such a wave-form contains the largest proportion of a fundamental sinusoidal component. The crest-amplitude of the fundamental sine-wave component of a unit-size square-wave is about 30% greater than that of the square-wave proper. Thus in Fig. 9 we show a curve 40 plotting space-current $I_s$ against original alternating current $I_m$ in a coil, as in Fig. 7. Curve 40 indicates a highly non-linear relation between magnet-current $I_m$ and space current $I_s$ and shows that a sinusoidal variation of $I_m$ will effectively generate a square-wave component $I_s$ at twice the frequency of the magnetic field. This modulation process is shown in solid line. Addition of a direct-current component by a battery or by use of a permanent magnet, in the way suggested in Fig. 6, will result in a square-wave at the fundamental frequency, as shown by broken line in Fig. 9.

An embodiment of the invention to carry into practice the above novel principles is shown in Fig. 10. Its arrangement of electrodes and magnet will not only result in a desired square-wave operating characteristic outlined above, but the device will also operate at a much weaker magnetic field. Here a vessel 42 contains a cathode 43 and anode 44, which are so shaped and spaced that at normal operating potential and at zero magnetic field substantially all electric charge-carriers will be "focused" onto the anode. The path of these between electrodes is indicated by solid lines. Furthermore, additional anodes or collecting electrodes 45 and 46 are provided in order to collect all such charge carriers which will be deflected away from anode 44 when the magnetic field reaches a predetermined value. The space current is thus switched alternately from anode 44 to collectors 45, 46, and the resulting A.C. component across a load-resistor 47 is amplified in the manner described earlier. An increase in useful amplification may be had, according to the invention, by combining the alternating potential developed across a resistor 48 and through a coupling condenser 49 with the signal from resistor 47 in a push-pull input stage. This alternative is shown in Fig. 10 in dotted lines.

Still higher harmonic variants of the fundamental frequency may be derived in another embodiment of our invention shown in Fig. 11. In this structure a multiplicity of anode systems represented by sets of yoked anodes 51 and 52, are so interconnected by a pair of leads 53, 54, respectively, that a space current beam sweeping from cathode 55 of vessel 56 across the anodes will be switched from one anode system to another many times during a single cycle of magnetic field-current. The resulting A.C. component of the space-current will be a high-order harmonic of the field-current at coil 59, and an A.C. amplifier tuned to this higher frequency will be entirely insensitive to disturbances from the lower fundamental frequency.

The principle of magnetic focusing, rather than deflection, is used to advantage in the embodiment of our invention shown in Fig. 12. Here a vessel 60 contains a flat cathode 61 and two ring shaped electrodes 62 and 63. Of these electrodes, 62 may be designated an anode and electrode 63 a collector, or vice versa, or both may be used as active anodes, as the anodes 45 and 46 in Fig. 10. A solenoid shaped magnetizing coil 64 surrounds the space between the electrodes and generates a field substantially coaxial with ring-shaped electrodes 62, 63 or in the direction indicated by L. When the instantaneous value of the magnetic field is zero, substantially all space current will flow to anode 62, while in the presence of a magnetic field of predetermined value a major part of the charge-carrying particles will fall upon collector 63. Either one or both of the alternating potentials generated across resistors 65 and 66 may be used for amplification.

Another embodiment of our invention is very suitable for the measurement of electromagnetic radiation, as shown in Fig. 13. A cathode 68 is in this case applied directly to the inside surface of a vessel 69, whose wall is preferably permeable to the radiation in question, impinging from the direction indicated at L. The liberated electrons will leave the cathode and either fall on a ring-shaped anode 70 or on a flat collector 71, depending on the degree of magnetic focusing caused by the instantaneous field of a magnet-coil 72 energized by current $I_m$. Cathode 68 may be constructed in such a way as to obey Lambert's cosine-law of illumination, thereby rendering this embodiment particularly useful for illumination measurement and control. The A.C. component of the space-current striking either or both electrodes 70, 71 may again be conveniently used for amplification through a tuned amplifying system, generally designated 73 in Fig. 13.

The alternating magnetic field necessary for optimum operation can be greatly reduced in intensity if the anode voltage applied to the electrodes is reduced from a customary value to one barely sufficient for space current saturation. At such low anode potential the electron velocities are correspondingly reduced and less magnetic field is required for deflection, suppression or focusing of the charge-carrying particles.

To illustrate, Fig. 14 shows a family of curves presenting space current $I_s$ plotted against anode voltage $E_a$, corresponding to three different parameters which, for instance, could be three different light intensities. These curves show that saturation starts approximately where they intercept the broken line 74. The anode voltage for a given parameter should, according to our invention, be adjusted close to the value corresponding to this intersection.

In order to further reduce the sources of undesired A.C. signals from the input circuit, the structure enclosed in the space-discharge vessel should be made of non-magnetic materials. This will avoid their being excited to vibration by the variable magnetic field of the modulating coil. Another source of disturbance will be avoided if the anode and cathode are so oriented with respect to the magnetic field that no eddy-currents are induced in them. If necessary the electrodes may be slotted in a manner to reduce such eddy-currents.

Furthermore, we propose to construct and fasten the electrodes with sufficient rigidity to guard against vibration at or near the frequency of maximum amplification of the amplifier system. This will reduce disturbances caused by the mechanical shock-excitation ("microphonics") such as are commonly experienced in such systems.

In accordance with the invention we can also synchronize the output indication with that of the input by using the system shown in Fig. 15. In this form the output of an A.C. amplifier 78 energizes a field-winding 79 of indicator 80, while the winding of the indicator rotor 81 is energized from an A.C. source 82 in synchronism with the field of magnet 83 in the input circuit. In this manner we eliminate all non-linear elements from the output circuit and we obtain in indication related to the phase and magnitude of the A.C. input signal (synchronous rectification). By connecting the field winding 79 to the amplifier a perfect power match may be obtained without the use of a transformer, assuming that this winding is wound to the proper impedance.

The output circuit described will of course respond only to the A.C. signals of the field frequency; thus further filter circuits are unnecessary. For controlling a mechanical movement as a function of phase and amplitude of the output, we can, according to this invention, connect the field winding of a local or remote electric motor to the amplifier output terminals. If we energize the armature of this motor in synchronism with coil 83 in the input circuit, we will obtain a mechanical torque whose direction and magnitude is a function of the phase and magnitude of an output voltage of the proper frequency.

Our invention also lends itself eminently to the amplification of space currents present in a number of separate discharge vessels. Fig. 16 shows, for instance, three phototubes 84, 85 and 86 arranged to actuate an output device 87 which will indicate the integral of the light falling on all three cells under modulation of the latter by electromagnetic coils 88. Clearly the three phototubes may have different spectral response or they may be provided with different filters, thereby integrating the total light flux of a predetermined spectral distribtution.

Fig. 17 shows a novel system for the separate indication of quantities from a multiplicity of signal-input devices. Three space-discharge vessels 89, 90 and 91 are shown again, each provided with a magnetic field coil 92. These electromagnets are energized by alternating currents of different frequencies $f_1$, $f_2$ and $f_3$ which may conveniently be generated by local electronic oscillators. With proper design of amplifier 93 we assure simultaneous amplification of the three signal voltages without interference between them; and we further obtain perfect separation of the output signals by using synchronous output devices 93, 94 and 95 which act as sharply tuned filters for the respective frequencies. A large number of independent small voltages may be amplified for remote utilization by using a single amplifier in this embodiment of our invention.

Our invention is not limited to the use of extraneous A.C. sources or separate A.C. generators for its operation. It is possible, as shown in Fig. 18 in another embodiment of our invention, to use a part of the A.C. output energy for energizing the magnetic field in the input circuit. Here the coil 96 is energized from the output through a pair of conductors 97. In this arrangement no oscillations exist while the space current between the cathode 98 and anode 99 of tube 100 is below a predetermined small value. As soon as this value is exceeded, oscillations will start and they will sustain themselves until the space current again drops below that level. If at the predetermined threshold level we desire to operate an indicator or relay, such can easily be accomplished. Device 101 denotes such an indicator of the visual or acoustical type actuated by the oscillations of the circuit. The predetermined threshold level of oscillation may be adjusted by varying the gain of the amplifier or attenuating the original source of space current. In order to maintain a constant exciting field over a wide range of input signals a limiting device 102 of known construction may be included in the feed-back path.

This system may be used in embodiments having several input devices connected to their input and requiring selective indication in the output. Fig. 19 shows a system in which input devices 103, 104 and 105 are energized by electromagnets 106, 107 and 108 tuned with condensers 109, 110 and 111 to different frequencies. Separate indicating or controlling means 112 are each tuned to one of these frequencies so as to respond only to signals of the correlated input device. These output devices may also be mechanically tuned relays or the like. In the absence of any space current from all input devices no oscillations will exist. When, however, space current passes through one of the input devices 103, 104 and 105, oscillations will be set up at one of the three possible frequencies, determined by the respective tuned circuits associated with the space discharge vessels. This oscillation will only be indicated in the output device tuned to the same frequency. Thus there is provided a device which will set off a controlling action in a remote location correlated to space current being passed by one of a multiplicity of space-discharge devices connected to the input of a single amplifier. This embodiment does not require a multiplicity of A.C. generators at many frequencies to insure its operation. A special feature is that it will only respond to one input signal at any time and that it will only become sensitive to another signal after the space current in the first space discharge vessel has been reduced below a predetermined level. Appropriate controlling means may be connected to the output circuit for automatically re-establishing that condition.

Our invention may be also used to good advantage in determining and controlling the ratio of two physical quantities. Fig. 20 shows an arrangement for determining the equality of space current in a pair of discharge devices 113 and 114 which are in the field of electromagnets 115 and 116, respectively. Provisions are made in this case to assure the modulation of the space current at the fundamental frequency of the magnetic field, as has been described earlier. The electromagnets are so connected that they modulate the space current passed through space-discharge vessels 113, 114 in opposite phase relation, that is the current in one instant is decreased to its minimum in one circuit while it is passing its crest in the other one. These two "out-of-phase" A.C. components may be brought to equality either by adjusting the quantities which generate the space current (radiation, ionization), or by electrical attenuation or balancing in the load circuit, as at resistors 117 and 118 of a voltage divider. In either case the signal to an amplifier 119 may be made zero for a predetermined ratio of space currents, while on either side of this balanced condition the resultant signal will be finite but of opposite phase. The variable-ratio load circuits at 117, 118 may be calibrated in terms of space current ratios and the zero-balance position will be independent of the absolute level of space currents. In the output of amplifier 119 we may employ synchronous and phase-sensitive indicating or controlling means 120 to merely indicate the off-balance condition of the input or to actuate controlling mechanism for restoring the desired ratio. The torque of the output means will again be proportional to the sign and magnitude of the "off-balance" signal, assuring the fast restoration of desired balance without the use of relays or the like.

In another embodiment of our invention, shown in Fig. 21, a pair of space current electromagnetic modulating units, generally designated 121, 122 are energized from the output of the amplifier 123. The singular feature of this arrangement is that the frequency of the overall oscillation of the system will depend on the direction of unbalance in the input circuit. The reason for this is found in the difference of phase in the two signals generated on opposite sides of the balance point. As a result the amplifier and the associated magnetic fields will oscillate either at frequency $f_1$ or $f_2$, depending on the direction of unbalance in the input circuit. In the state of exact balance no oscillations will exist. If we now connect two indicating or controlling means 124 and 125 to the output, each responding only to $f_1$ and $f_2$ respectively, they will indicate the direction and magnitude of unbalance, or may control appropriate means for the purpose of restoring the condition of balance. Tuned relays or the like as well as electric motors connected in a synchronized circuit described earlier may be used to actuate mechanisms as a function of the direction and magnitude of unbalance.

This is a continuation application of our co-pending application, Serial No. 273,526, filed February 14, 1952, which co-pending application is a divisional application of our original application, Serial No. 22,648, filed April 22, 1948, now Patent No. 2,605,428.

We claim:

1. A system operating on a source of line voltage to amplify minute space currents comprising means to generate a space current, means energized from said source to generate a periodically varying electromagnetic field to modulate the space current, and means energized from said source for the frequency selective amplification of a modulated signal derived from the space current, in which system said modulating field generated by said generating means is so selected to obtain a variation in space current which is inversely proportional to the variation in line voltage of said source and which compensates for variation in the gain of said amplification means.

2. In an electronic device, an at least partly evacuated vessel; a cathode electrode in said vessel; at least one anode electrode in said vessel spaced from said cathode electrode, means to generate a space current across said electrodes; means operable from a source of alternating current to generate an alternating magnetic field having a predetermined frequency, said field extending in the space between said electrodes; an electric circuit including an amplifier for alternating current energized from said source; means for electrically connecting said electrodes to said circuit to feed into the input of said amplifier alternating current potentials derived from said space current under the influence of said magnetic field; frequency selection means associated with said amplifier and arranged to be tuned to a frequency proportional to said predetermined frequency; and means connected to said circuit for receiving current potentials amplified by said amplifier, said magnetic field generating means being operated at such an intensity that an increase and decrease of the supply voltage of said source results in a decrease and increase, respectively, in the modulation efficiency, whereby, the device will operate at a high degree of stability against source voltage variations.

3. In an electronic device, an at least partly evacuated vessel; a cathode electrode in said vessel; at least one anode electrode in said vessel spaced from said cathode electrode, space current generating means applied to said electrodes, means operable from a source of alternating current to generate an alternating magnetic field having a predetermined frequency; said field extending in the space between said electrodes; an electric circuit including an amplifier for alternating current energized from said source; means common to said space current generating means for electrically connecting said electrodes to said circuit to feed into the input of said amplifier alternating current potentials derived from said space current under the influence of said magnetic field; said space current generating means including resistor means preventing shunting tube impedance by said space current generating means; frequency selection means associated with said amplifier and arranged to be tuned to a frequency proportional to said predetermined frequency; and means connected to said circuit for receiving current potentials amplified by said amplifier, said magnetic field generating means being operated at such an intensity that an increase and decrease of the supply of voltage of said source results in a decrease and increase, respectively, in the modulation efficiency, whereby, the device will operate at a high degree of stability against source voltage variations.

References Cited in the file of this patent

UNITED STATES PATENTS

| | | |
|---|---|---|
| 1,552,219 | Mercer | Sept. 1, 1925 |
| 1,628,466 | Hull | May 10, 1927 |
| 1,894,023 | Dawson | Jan. 10, 1933 |
| 2,114,035 | Skellet | Apr. 12, 1938 |
| 2,155,844 | Serrell | Apr. 25, 1939 |